UNITED STATES PATENT OFFICE.

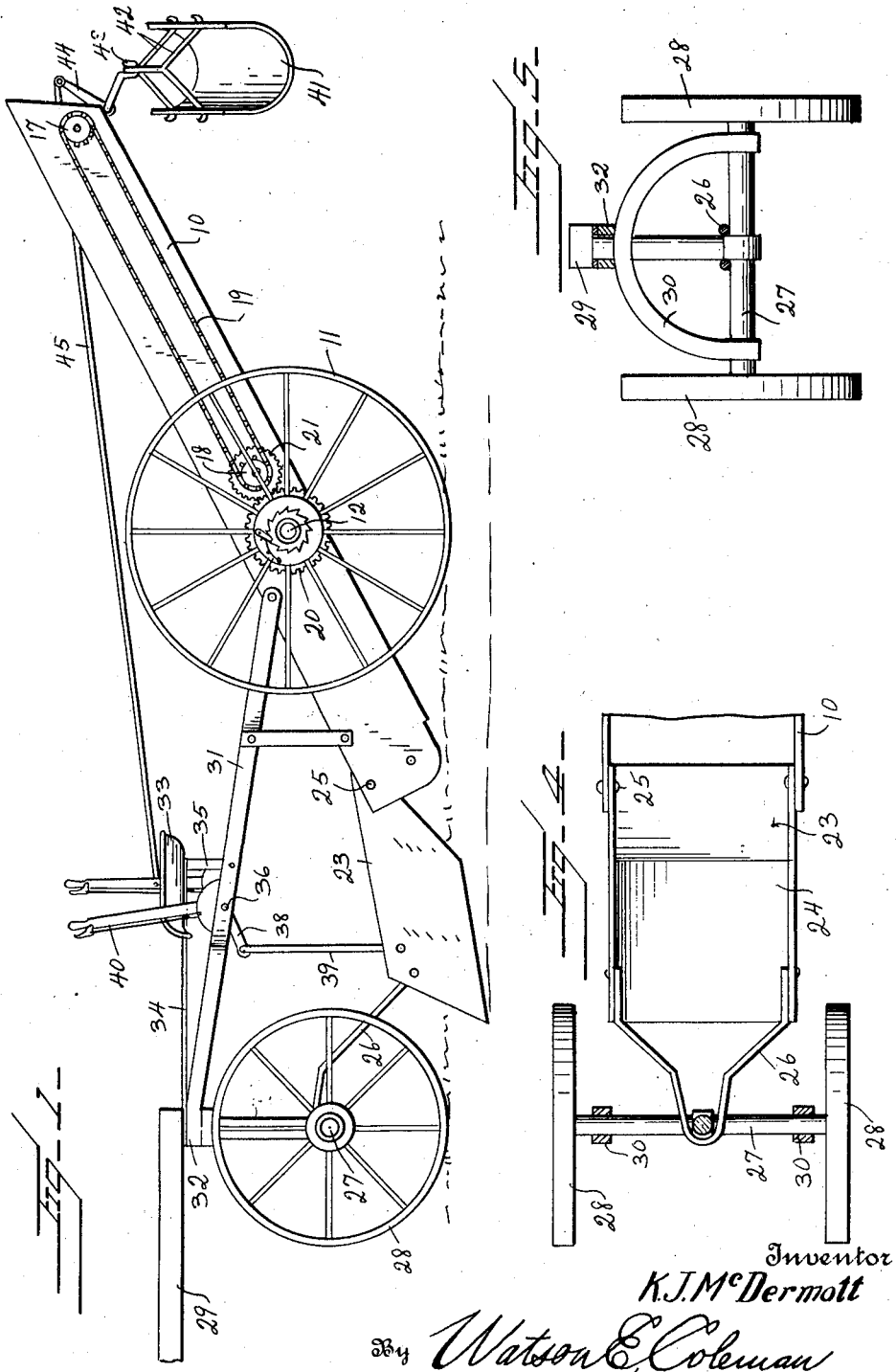

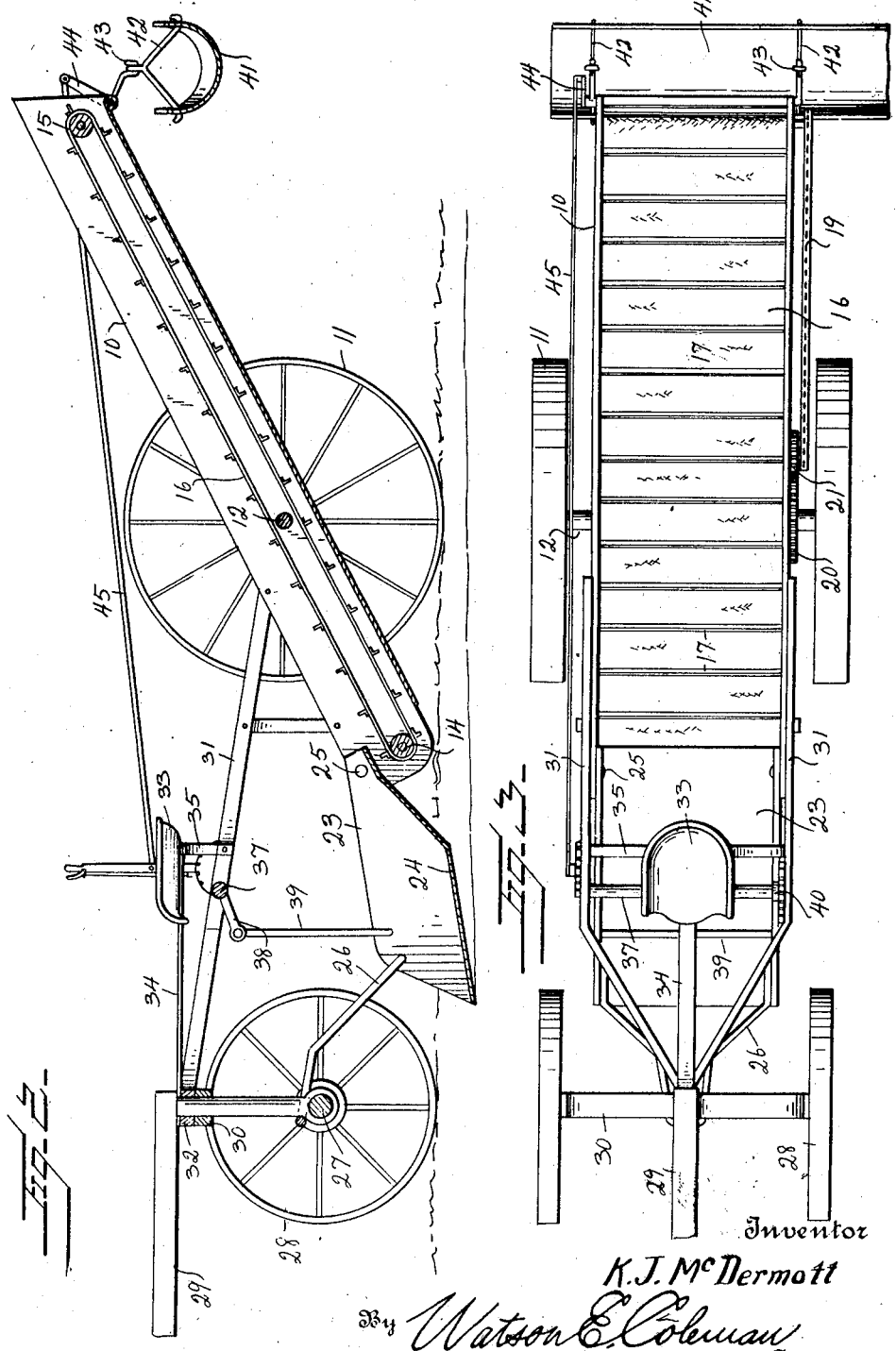

KEEN J. McDERMOTT, OF CEDAR, COLORADO.

DITCH-EXCAVATING MACHINE.

1,338,784.     Specification of Letters Patent.     Patented May 4, 1920.

Application filed September 11, 1918, Serial No. 253,589. Renewed September 29, 1919. Serial No. 327,156.

*To all whom it may concern:*

Be it known that I, KEEN J. MCDERMOTT, a citizen of the United States, residing at Cedar, in the county of San Miguel and State of Colorado, have invented certain new and useful Improvements in Ditch-Excavating Machines, of which the following is a specification, reference being had to the accompanying drawings.

This invention relates to excavating machines and particularly to machines for excavating ditches.

The general object of my invention is to provide a machine of this character which is very simple in construction, easily handled and effective in use, and a further object is to provide a machine of this character including an endless elevator, a trough shaped casing therefor and an excavating shovel pivoted to the lower end of the casing and held to its work by the weight of the driver and provide means whereby the shovel may be relatively raised or lowered.

A further object is to provide improved means for supporting the seat and adjusting the excavating shovel.

My invention is illustrated in the accompanying drawings, wherein:—

Figure 1 is a side elevation of an excavator constructed in accordance with my invention;

Fig. 2 is a vertical longitudinal section thereof;

Fig. 3 is a top plan view;

Fig. 4 is a top plan view of the shovel 23 and the front axle;

Fig. 5 is a front elevation of the front axle, the yoke 26 and the bearing 32 being in section.

Referring to these drawings it will be seen that my improved excavating machine comprises an elongated body designated 10 which is the form of a trough and which is supported by means of traction wheels 11, mounted nearer the forward end of the body than the rear end. These traction wheels mounted upon the axle 12 and provided with ratchet and pawl devices causing a rotation of the shaft 12 upon the forward movement of the machine, but permitting the shaft 12 to remain idle upon the rearward movement of the machine.

Mounted upon forward and rear rollers 14 and 15 is an endless elevator 16 which is preferably in the form of a web of suitable flexible material, and which carries upon its face transversely extending blades. The roller 15 is mounted upon a shaft carrying a sprocket wheel 17 and mounted upon one of the walls of the body 10 is a sprocket wheel 18. A sprocket chain 19 passes over these sprocket wheels and transmits power from the sprocket wheel 18 to wheel 17. The shaft 12 carries a gear wheel 20 which meshes with a gear wheel 21 mounted on the shaft of the sprocket wheel 18 and drives it.

Pivotally mounted upon the forward end of the body 10 between the side walls thereof is an excavating shovel 23. This shovel has a bottom 24 which at its rear end extends upward and rearward over the forward end of the endless carrier or elevator 16. The side walls of the shovel are pivoted to the body by any suitable means as at 25. The forward end of the shovel has pivoted thereto a forwardly directed yoke 26. Disposed beneath the forward end of this yoke is a transverse axle 27 carrying supporting wheels 28. A tongue 29 has its rear end vertically extended and engaged with the axle 27 and braces 30 brace the tongue from the axle. Swingingly mounted on the sides of the body 10 between the forward end of the body and the axle 12 are seat supporting members 31 which extend forward in convergent relation and are formed at their ends with an eye or bearing 32 through which the tongue 29 passes. A seat 33 is carried upon a seat supporting bar 34 extending upward and rearward from the eye 32 and this seat is likewise supported by a brace 35 extending to the members 31.

The members 31 are formed with bearings 36 forward of the seat braces 35 and mounted in these bearings is a transversely extending rock shaft 37 which at its middle is formed with an upwardly extending arm 38, and swung to this arm is a bail 39 which at its ends is connected to the side walls of the shovel. A lever or handle 40 is connected with the rock shaft.

In order to carry the dirt excavated from the ditch away from the machine, I provide a transversely extending trough 41 which is supported upon the rear end of the body 10 just below the elevator. This trough is supported in swinging bails 42, engaging hooks 43 on the body and the trough is disposed at an angle which will discharge the dirt. The trough may be raised or lowered by mounting one of the hooks 43 so that it may rotate and attaching thereto an arm 44 from which a rod 45 extends to a point adjacent the driver's seat.

In the practical use of this machine the weight of the driver depresses the forward end of the machine and then by shifting arm or handle 40 the shovel may be depressed or raised thereby regulating the depth of cut. The shovel of course cuts the dirt and the excavated material is forced back up the bottom of the shovel and on to the endless carrier by which it is raised and delivered to the trough 41.

While of course I do not wish to be limited to any detailed construction of the invention, the machine will have a length of about 12 feet, a width of 2 feet, and the excavated dirt will be elevated to a height of about 8 feet. With 4 horses and 1 man acting as driver, the machine will excavate about 600 yards of dirt a day. The shovel will cut ordinarily about 3 inches deep though this may be regulated of course by regulating the depth of cut.

While I have illustraed certain details of construction I wish it understood that these details may be varied in many ways without departing from the spirit of the invention.

Having thus fully described my invention, what I claim is:—

1. In a ditching machine, the combinations with a trough-shaped body, having supporting wheels, of a tongue spaced in advance of the body and provided with a depending vertical part, a forward axle provided with supporting wheels mounted in a bearing on the vertical part, a frame having its rear end rigidly fixed to the body and its forward end provided with bearing in which the vertical part is swivelly mounted, an excavating shovel pivotally mounted upon the forward end of the body between the sides thereof and extending downwardly and forwardly, a bail member connected to the sides of the shovel and having a loop end movable vertically on the vertical part, means carried by the frame and connected to the shovel for raising and lowering the same, and a conveyer in the body provided with operating connections with the first supporting wheels.

2. In a ditching machine, the combination with a trough-shaped body having supporting traction wheels, and provided with a conveyer therein, having operating connections with the wheels, of a frame having its rear part fixed to the sides of the body, the sides of the frame converging forwardly and terminating in an eye, a tongue having a depending vertical part swiveled in the eye of said frame, a forward axle mounted in a bearing at the lower end of the depending part, and provided with wheels, means mounted upon the forward axle provided with upwardly converging portions, a member connecting the upwardly converging portions and receiving vertical part of the tongue, an excavating shovel pivotally mounted between the sides of the forward end of the body extending forwardly and downwardly, a bail pivotally mounted in the sides of the shovel and having a forward loop end movable vertically on the vertical part when the shovel is raised, and means carried by the frame and connected to the shovel, whereby it may be raised and lowered.

In testimony whereof I hereunto affix my signature in the presence of two witnesses.

KEEN J. McDERMOTT.

Witnesses:
A. L. WESTCOTT,
E. E. SPEICHER.